358-86. OR 3,517,120 SR

SEARCH ROOM

T5003
X5013
Rm

INVENTOR.
Earl L. Bunting
BY
Johnson and Kline
ATTORNEYS

June 23, 1970 E. L. BUNTING 3,517,120

NURSE CALL SYSTEM INCLUDING A COAXIAL CONDUCTOR ONLY CONNECTING A PLURALITY OF SIGNALS

Filed Aug. 26, 1966 4 Sheets-Sheet 2

INVENTOR.
Earl L. Bunting
BY
Johnson and Kline
ATTORNEYS

INVENTOR.
Earl L. Bunting
BY
Johnson and Kline
ATTORNEYS

INVENTOR.
Earl L. Bunting
BY
Johnson and Kline
ATTORNEYS

United States Patent Office 3,517,120
Patented June 23, 1970

3,517,120

NURSE CALL SYSTEM INCLUDING A COAXIAL CONDUCTOR ONLY CONNECTING A PLURALITY OF SIGNALS

Earl L. Bunting, 34 Bermuda Road, Westport, Conn. 06880

Filed Aug. 26, 1966, Ser. No. 575,328
Int. Cl. H04n *7/00, 7/10*
U.S. Cl. 178—6.8 10 Claims

ABSTRACT OF THE DISCLOSURE

A nurse call system comprising a circuit including a coaxial cable only for connecting signals at a patient's bed station, a room location or dome signal and a nurses' console, said signals being actuated by the patient at the bed station and extinguished by the nurse at the nurses' console by actuation of the answering switch. The actuation of the answering switch also places the nurse and patient in audio communication at audio frequencies. The circuit also includes a bath station signal which produces a signal at the nurses' console but the bath station signal can only be extinguished by a visit by the nurse to the bath station. The circuit further includes means establishing priority operation of the signals for emergency operation.

Heretofore, nurse call system in hospitals have required many cables involving a large number of conductors to be run through the hospital from the master station, including the nurse console and desk station, to each of the patients' rooms and these systems included many relays and control switches which were expensive and difficult to maintain.

The present invention overcomes these difficulties by providing a very simple nurse call or control system which will provide a low voltage DC power and signal at the bed station or patient station, and a room locating or dome signal which will indicate to the nurse the room location of the patient involved, such signal usually being located in the hospital corridor at a point adjacent the room of the patient and also having a signal on the console at the nurse station, which signal may be extinguished at the nurse station or at the patient station.

A feature of the invention resides in the fact that a single coaxial conductor extends from the patient station and room location station to the master station which is usually at a remote position such as from the patient station.

One object of the invention is to also provide a signal at a bath station associated with the patient station, which signal when energized also energizes the signal at the room location station and a bath signal at the master station. However, the signal can be extinguished only at the bath station so that it is necessary for the attendant to be present. A feature of this part of the invention resides in the fact that when the bath station signal is energized, the associated patient station signals will be temporarily deenergized until the bath signal is extinguished, thus giving priority to the bath signal over the patient stations.

Another feature of the invention resides in the signal system wherein the circuit includes a normally energized SCR (silicone controlled rectifier), which is noconductive, which is rendered conductive by the patient momentarily closing a normally open momentary contact switch at the patient station.

A further feature of the invention resides in the fact that each patient station has a microphone-speaker and the master station adjacent the nurse desk console has a microphone-speaker and, upon actuation of the answering switch for a particular patient station on the nurse desk console which extinguishes the signals, the microphone-speaker combinations are connected together over a single coaxial conductor so that audio communication is had between the particular patient and the nurse at audio frequencies.

Should it be desired to permit the patient to have a television program separate from and in addition to the nurse call system, the system of the present invention can be readily accommodated to accomplish this by utilizing the single coaxial conductor thereof for the purpose of transmitting the power and/or the television signals from a signal receiving or generating means in the master station to a television receptacle at the patient station which receptacle is connected to the coaxial conductor through an RF high pass filter for the signals and a DC low pass filter for the power, said receptacle receiving a plug from a television receiver at the patient station.

Also, if it is desired to have the patient see on the television set the nurse answering the call, the present invention provides for a television camera at the master station which, when the nurse actuates the answering switch, will be connected to the patient coaxial conductor and transmit the television picture from the camera on a special intermediate frequency which is receivable by any television set which is operative and connected to the particular patient station, said intermediate frequency causing any radio frequency signals, other than the intermediate frequency, passing to the television receiver from the master station to be blanked out thus giving the patient a priority view of the nurse's picture.

A still further feature of the invention resides in the fact that each patient station is also provided with a key-operated priority status switch which, if the patient is seriously ill, can be actuated by a nurse to denote emergency status. This connects means for altering the signal and a priority circuit to the particular patient circuit to indicate the emergency situation and at the same time render inoperative the other signals from other beds in the same room so that the seriously ill patient will receive emergency attention.

Other features and advantages of the invention will be apparent from the specification and claims when considered in connection with the accompanying drawings in which:

Figure 1:
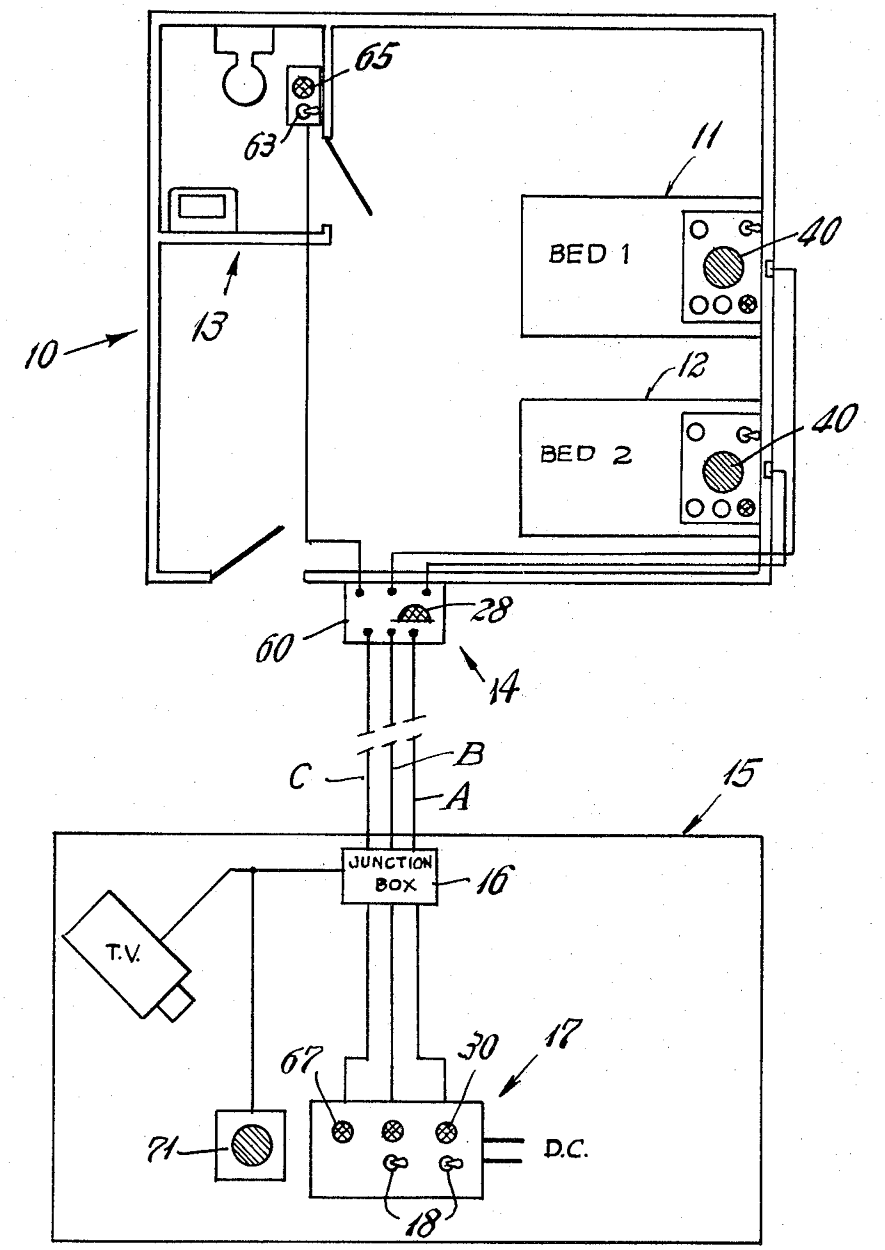
FIG. 1 is a schematic drawing of the system.

This system is adaptable to lage hospital hall or corridor installations. However, to simplify the disclosure of the invention the system is illustrated in FIG. 1 as applied to a room 10 with a plurality of patient stations 11, 12 (bed No. 1 and bed No. 2), an associated bath station 13, and a room locating station 14 in the hall outside of the patient's room. These stations are connected to a remotely located master station area 15 having a DC source of power, said master station area comprising a junction box 16 and nurse desk console having an answering switch 18 for each patient station, said stations and bath station being connected to the master station by coaxial conductors A, B,C.

Each station is provided with a suitable attention-attracting signal. While these sginals may be visual and/or audible, in the herein illustrated form of the invention the signal is shown as a light signal which may be continuous or flashing as required.

Figure 2:
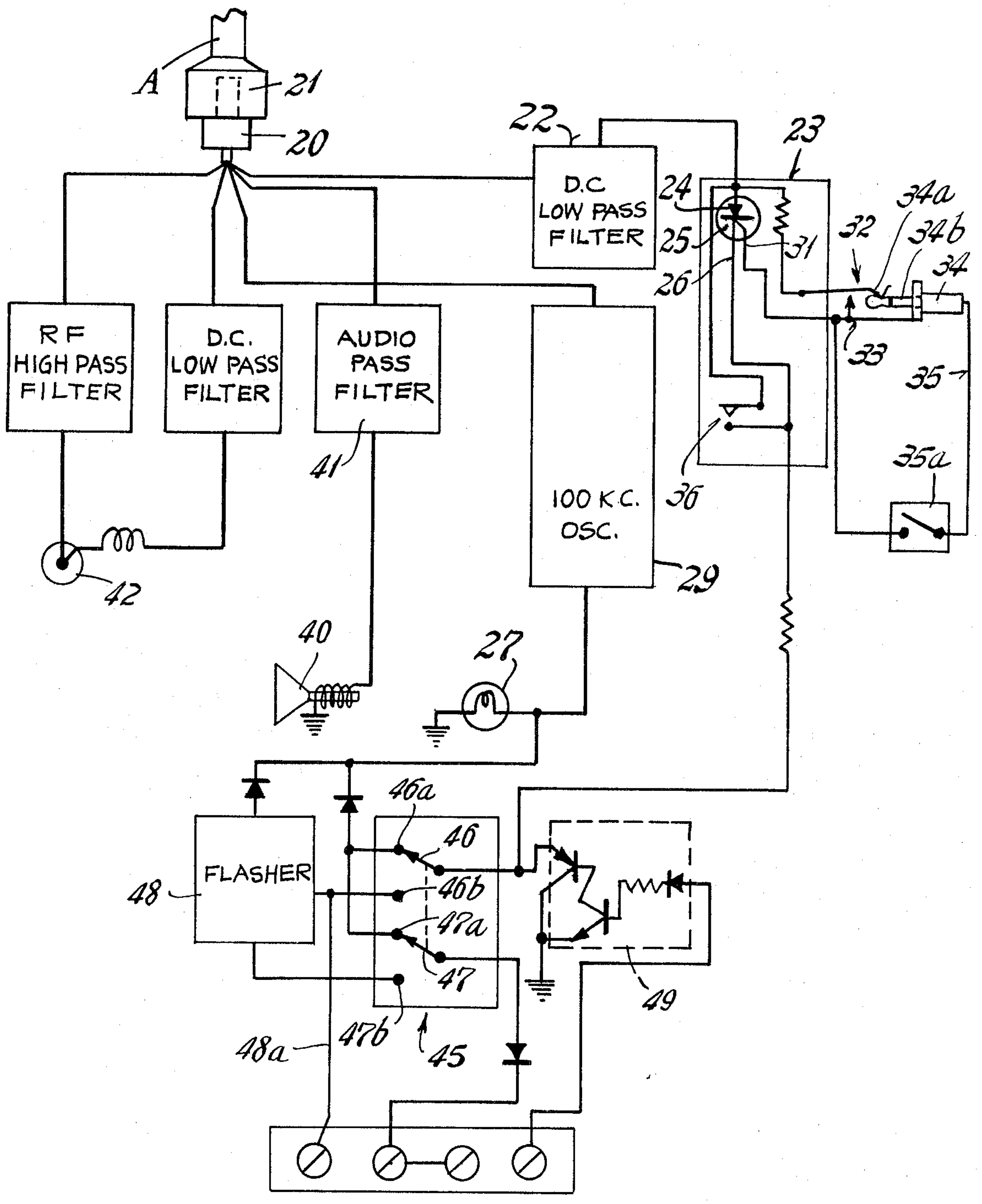
FIG. 2 is a circuit diagram of a patient station.

The wiring diagram for each patient station is the same so only one is shown in detail in FIG. 2 in which a coaxial plug 20 on the patient plugs into the coaxial receptacle 21 which is located at the patient station and on the end of the coaxial conductor A which has the direct current impressed on it. The direct current passes through a low pass filter 22 to the control switch means 23. In the form of the invention shown in this figure the DC voltage is impressed on the anode terminal 24 of an SCR 25, the cathode terminal 26 of which is connected to a signal circuit for a lamp 27 at the patient station and to a dome lamp 28 at the room location station 14. Also, it energizes an oscillator 29 the signal of which is fed back to the coaxial conductor and to actuate a corresponding lamp 30 at the master station.

The gate terminal 31 of the SCR 25 is connected by a normally closed switch 32 in jack receptacle 33 which is held open by the plug 34 of the patient's call cord 35 when in position, but which will automatically close the circuit to the signal if the cord plug is inadvertently removed. The tip **34*a* and sleeve 34*b* of the plug engage the terminals of switch 32 and connect them to the terminals of a normally open, momentarily operated call-in switch 35*a* on the call cord which when closed, applies a proper voltage to the gate terminal 31 of the SCR 25 to render it conductive, thus rendering the lamp, oscillator and other circuits controlled by the SCR operative. The oscillator for purpose of illustration provides a 100 kc. signal which is applied to the coaxial conductor and lights the signal lamp 30** at the master station.

When it is desired to cancel out the call, a separate normally open cancel switch 36 is operated which short-circuits the SCR 25 and renders the SCR nonconductive to extinguish the circuit and signals.

Figures 3, 5:
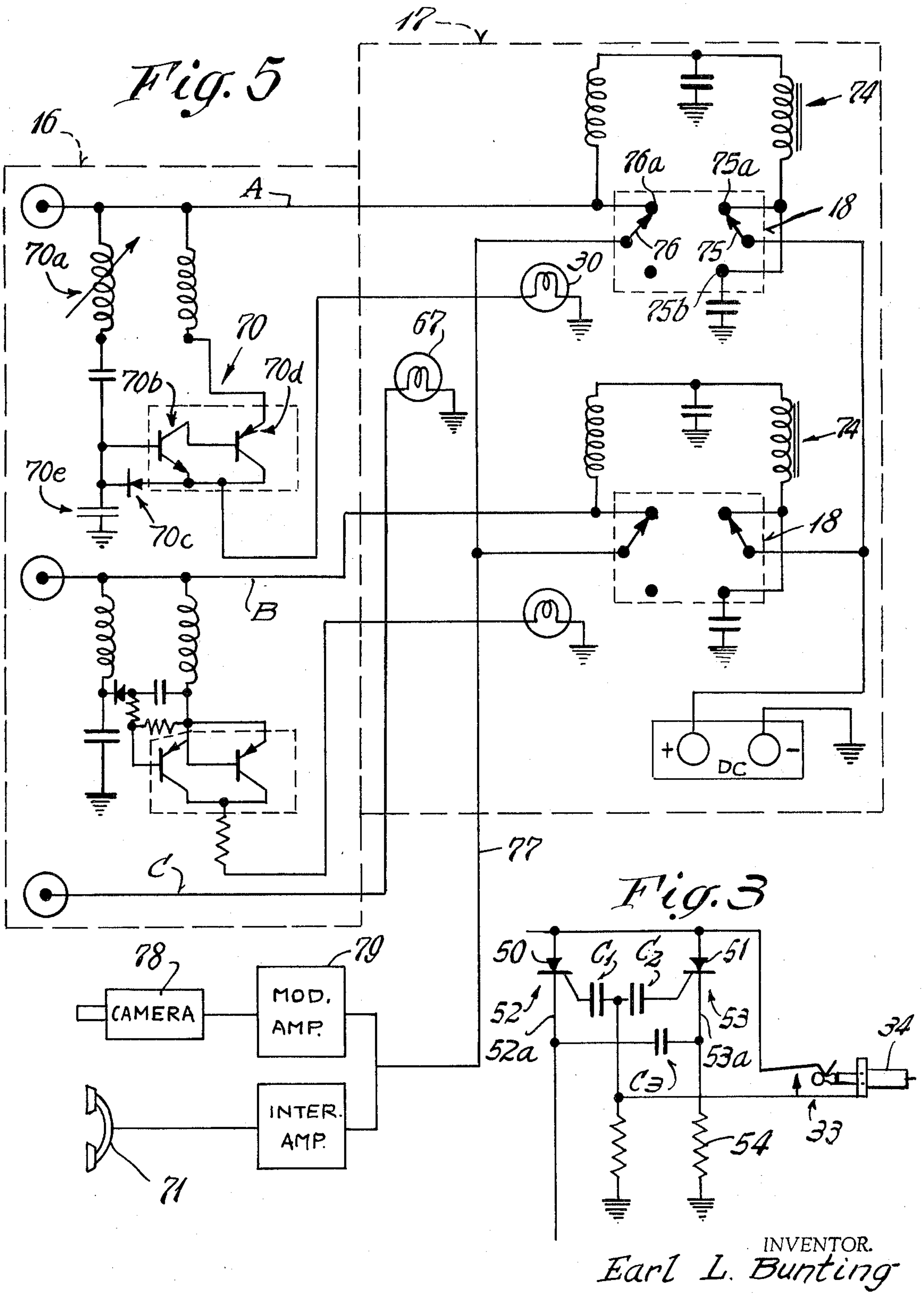
FIG. 3 is another form of control switch means.
FIG. 5 is a circuit diagram of the master station showing the junction box and nurse desk console.

In the form of the invention shown in FIG. 3, the control switch means has the DC voltage applied to the anodes 50, 51 of SCR 52 and SCR 53 which are connected in parallel and are energized but not conducting. The cathode **53*a* of SCR 53 is connected to ground through a high resistance 54 and the cathode 52*a* of SCR 52 is connected to the signal circuits. When the plug 34 of the patient call cord 35 is inserted in the receptacle 33 and the normally open call switch 35*a* is closed, it provides a positive pulse to both gate terminals through condensers $C_1$, $C_2$ rendering the two SCR devices conductive. However, since SCR 53 is connected to ground through the high resistance, it will not have enough current flow to maintain conduction. SCR 52** continues to be conducting and actuates the signal. It also charges the condenser $C_3$.

When the same call switch is again operated it will cause SCR 53 to be conductive momentarily and apply a plus voltage to the associated terminal of the condenser $C_3$, making the other terminal of the condenser $C_3$ which is connected to the cathode of the SCR 52 rise above the source of voltage and render the SCR 52 nonconductive. This permits the patient to use a single call switch on the patient's call cord for calling and/or cancelling the signal.

Also, at the patient station there is a monitor microphone-speaker 40 (FIG. 2) which is connected to the coaxial conductor through an audio pass filter 41. Also connected to the coaxial conductor at the patient station is a coaxial receptacle 42 for receiving a plug from a television receiver (not shown).

If desired, the patient station can have a key-operated priority switch 45 having movable contacts 46, 47 which, if turned from the normal position in which the movable contacts 46 and 47 engage contact **46*a*, 47*a* to a position in which the movable contacts 46 and 47 engage the contacts 46*b*, 47*b* will connect a flasher 48 into the circuit for altering the actuation of the lamps 27, 28 and also the oscillator 29 connected therewith to cause lamp 30** to be alternately energized and produce a flashing signal to attract attention.

The contact **46*b* also contacts DC through conductor 48*a* to a circuit in the adjacent bed stations similar to the priority call circuit 49** for rendering inoperative any subsequently placed nurse call signals, other than a bath signal, from any other patient stations by grounding the signal circuit voltage after the SCR to provide a bypass for the current from the SCR and thus rendering the signal circuit inoperative until such time as the priority (flashing) circuit is extinguished, thereby maintaining the SCR conducting (in memory) until such time as the priority signal was removed, whereupon other nurse call signals are rendered operative again, thus insuring that the extremely ill patient was given priority attention.

Figure 4:
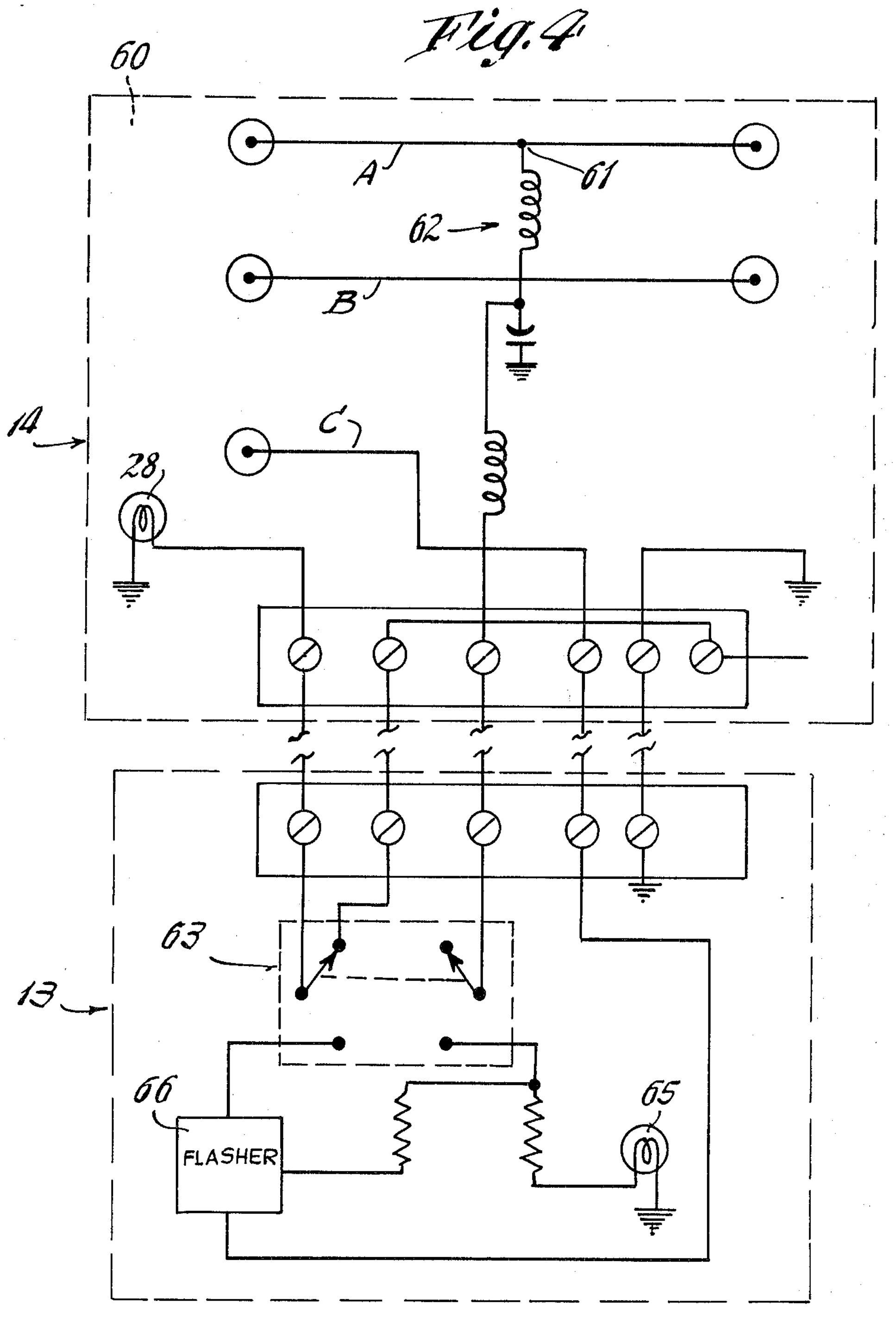
FIG. 4 is a circuit diagram of the location station and bath station.

The circuits for the room location station 14 and bath station 13 are shown in FIG. 4. The room location station 14 comprises a box 60 (FIG. 1) having the dome lamp 28 mounted thereon to be normally energized whenever any call-in switch **35*a*** is closed. It also provides for entrance of the free coaxial conductors A, B, C into the room.

As shown in FIG. 4, one of the patient station coaxial conductors is tapped at 61 by a DC low pass filter 62 to energize the bath station 13. Should a patient in the bathroom at the bath station need assistance, there is provided, in accordance with the present system, a manually operated double pole, double throw switch means 63 which, when actuated, lights a signal at the bath station by connecting the lamp 65 and flasher 66 to the tapped low pass DC filter 62 from the room location station. At the same time the switch disconnects the signal lamp 28 at the room location station 14 from its circuit fed from the bed station and substitutes its energy out of the bath flasher which alternately flashes the dome light 28 and a bath signal light 67 at the master station thereby providing bath call priority. This circuit, however, will remain operative until it is cancelled at the bath station since it cannot be cancelled from the master station, thus insuring that it will not be cancelled until the patient in the bath station is attended to.

The circuits at the master station area 15 are shown in FIG. 5. According to the present invention, this station embodies a junction box 16 for receiving the coaxial conductors A, B, C from the patient stations and bath station and a nurse desk console 17 connected to the junction box as shown in FIG. 1.

The junction box 16, as shown in FIG. 5, renders flexibility to the system permitting simplification of the nurse desk console 17 and provides a coaxial feed from the remote stations. For each bed station the junction box feeds the coaxial conductors A and B to console where DC energy is injected for operating the system. Within the junction box 16 the 100 kc. signal produced by the 100 kc. oscillator at the patient's bed station is received to actuate a solid state switch 70 which in turn lights the respective signal light 30 at the console. The operation of this solid state switch is as follows. The 100 kc. signal generated by the oscillator 29 is received from the coaxial cable A (FIG. 5) through the tuned circuit **70*a*, which renders the base of transistor 70*b* plus with respect to its emitter, through the diode action of 70*c* charging 70*e* with the signal energy. This voltage renders transistor 70*b* conducting which completes base circuit of transistor 70*e* rendering 70*d* conducting as a switch to light signal 30. This switch will actuate the lamp in exact accordance with the 100 kc. signal, be it solid or flashing, from the patient's bed station. It provides a through connection for the signal conductor C from the bath station to the bath signal lamp 67. It also provides a junction for connecting, through the answering switch 18, a microphone-speaker 71 at the master station with a microphone-speaker 40** at the patient station to provide two-way audible communication.

At the console 17 the DC energy is fed through a single pole, double throw section of the answering switch 18, through a DC low pass filter 74, to the coaxial conductor A to energize all signals in the system from the console. The contact 75, moving in either direction between 75*a* and 75*b* momentarily interrupts DC current, thus stopping conduction of the SCR at the patient station, and cancelling the signals. It will be noted that the switch 18 in either position provides DC power to energize the SCR 25 so that if the lamp has been extinguished by the answering switch, the SCR 25 can be rendered conductive again by the actuator of the switch 35*a*.

Contact 76 when connected to contact 76*a* of the answering switch 18 connects the intercom coaxial bus 77 selectively to each coaxial conductor leading to the separate bedside patient stations.

If it is desired to have the patient observe the nurse during the period in which communication is had between the patient and nurse over the system, the master station can be provided with a television camera 78 which is connected to the intercom bus 77 and the signals generated therein fed to the patient station along with the audio signals from the microphone-speaker unit so that the nurse may give visible instructions along with oral instructions to the patient if such is desired.

The camera 78 is adjustable to watch the nurse and feeds its video to a modulation oscillator-amplifier 79 which modulates its video frequencies onto the intermediate frequency of the television sets used which when received in the bed television receiver automatically disables the television receiver tuner by removing the B plus voltage to its tuner circuits and prevents all TV channel reception and a direct diode connection to the coaxial input signal to the IF circuits of the receiver to receive camera reception only.

Variations and modifications may be made within the scope of the claims and portions of the improvements may be used without others.

I claim:

1. A nurse call system comprising a plurality of patient stations, each having a signal and a patient control switch means including a normally open switch, a room location indicating station having a signal, and a master station including a junction box and a connected nurse console provided with a signal and an answering switch for each patient, and a circuit for connecting all said stations for a single patient comprising a coaxial conductor only and a normally energized nonconducting silicone controlled rectifier having an anode, cathode and gate terminals for operating the signal at the patient station, at the room location station, and at the master station, said master station having a source of DC power for energizing the system, said patient control switch means, upon actuation by the patient, providing a positive pulse causing the silicone controlled rectifier to become conducting and operating all of said signals and actuation of the answering switch at the nurse console interrupting the DC power and rendering the silicone controlled rectifier nonconducting and extinguishing said signals.

2. The invention as defined in claim 1 wherein the patient control switch means includes an extinguishing switch means for rendering the silicone controlled rectifier nonconducting.

3. The invention as defined in claim 1 wherein the patient station includes a microphone-speaker and the master station has a microphone-speaker, operation of the answering switch to extinguish the signals also closing a contact on the switch connecting the microphone-speakers at the stations whereby audible instructions may be transmitted.

4. The invention as defined in claim 1 wherein each patient station has priority switch means for connecting means into the circuit for altering all of the signals to show an emergency status.

5. The invention as defined in claim 4 wherein said priority switch means is provided with means for rendering the signals connected to other patient stations inoperative until the altered signal has been extinguished.

6. The invention as defined in claim 1 wherein a bath station is provided having a control switch means and a signal and a connection to the room location station signal, and a circuit connecting the station to the master station having a signal at the latter station, the circuit becoming conductive upon actuation of the control switch at the bath station to energize the signals and having means for rendering the signals associated with the patient stations inoperative until the bath circuit is rendered nonconducting, and means at the bath station for rendering the circuit nonconducting.

7. The invention as defined in claim 1 wherein the patient station is provided with a coaxial receptacle to receive a television receiver plug and said master station is provided with means for receiving RF signals and transmitting said signals to the coaxial receptacle at the patient station over said coaxial conductor.

8. The invention as defined in claim 7 wherein the master station is provided with a television camera directed on a nurse and supply a signal at an intermediate RF frequency capable of being received by all operating television receivers at the plurality of patient stations and taking priority over any RF frequencies other than said intermediate frequency when the answering switch is operated at the console for each patient station.

9. The invention as defined in claim 1 wherein the control switch means comprises a single pole, normally open momentary contact means operative in response to repeated operation thereof to alternately render the silicone controlled rectifier in the signal circuit conductive and nonconductive.

10. The invention as defined in claim 1 wherein the answering switch in moving from normal position to answering position opens the circuit to the silicone controlled rectifier to render the silicone controlled rectifier nonconducting and extinguish the signals, said switch in answering position again energizing the silicone controlled rectifier to enable it to be rendered conducting again from the patient station even though the switch remains in answering position.

References Cited

UNITED STATES PATENTS

| | | | |
|---|---|---|---|
| 3,215,774 | 11/1965 | Ikegami | 178—6.8 |
| 2,978,538 | 4/1961 | Breese | 178—6.8 |
| 3,423,521 | 1/1969 | Friesen et al. | |
| 3,105,873 | 10/1963 | Winston et al. | 178—6 |
| 3,215,998 | 11/1965 | Cloyd | 340—286 |
| 3,403,381 | 9/1968 | Haner | 340—171 |
| 2,355,934 | 8/1944 | Weld | 340—295 |

ROBERT L. GRIFFIN, Primary Examiner

R. K. ECKERT, JR., Assistant Examiner

U.S. Cl. X.R.

178—5.6; 340—286, 295

PO-1050
(5/69)

UNITED STATES PATENT OFFICE
CERTIFICATE OF CORRECTION

Patent No. 3,517,120 Dated June 23, 1970

Inventor(s) Earl L. Bunting

It is certified that error appears in the above-identified patent and that said Letters Patent are hereby corrected as shown below:

column 1, line 29 "system" should read--systems--; line 66, "noconductive" should read --nonconductive--.

column 2, line 54, "lage" should read --large--; line 64, insert "17" after "sole"; line 69, "sginals" should read --signals--.

column 3, line 3, insert --station-- before "plugs"; line 69, "contact" should read --contacts--.

column 4, line 1, "contacts" should read --connects--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents